United States Patent
Sundholm

(10) Patent No.: US 9,139,362 B2
(45) Date of Patent: Sep. 22, 2015

(54) METHOD AND APPARATUS FOR HANDLING MATERIAL IN A PNEUMATIC PIPE TRANSPORT SYSTEM

(75) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 346 days.

(21) Appl. No.: 13/578,264

(22) PCT Filed: Feb. 8, 2011

(86) PCT No.: PCT/FI2011/050108
§ 371 (c)(1),
(2), (4) Date: Aug. 10, 2012

(87) PCT Pub. No.: WO2011/098666
PCT Pub. Date: Aug. 18, 2011

(65) Prior Publication Data
US 2012/0304873 A1 Dec. 6, 2012

(30) Foreign Application Priority Data
Feb. 12, 2010 (FI) .................................. 20105145 U

(51) Int. Cl.
*B65G 53/48* (2006.01)
*B65F 5/00* (2006.01)
(Continued)

(52) U.S. Cl.
CPC .............. *B65F 5/005* (2013.01); *B02C 18/0084* (2013.01); *B02C 18/0092* (2013.01); *B65G 51/02* (2013.01); *B65G 53/48* (2013.01)

(58) Field of Classification Search
CPC .. B65F 5/005; B02C 18/0084; B02C 18/0092
USPC .......................... 406/70, 52, 56, 51, 108, 145
See application file for complete search history.

(56) References Cited

U.S. PATENT DOCUMENTS 3,621,774 A  11/1971 Dedio et al.
3,921,794 A * 11/1975 Casselbrant ................. 198/658
(Continued)

FOREIGN PATENT DOCUMENTS

| DE | 2504212 A1 | 8/1976 |
| EP | 0093825 A1 * | 11/1983 |
| FI | 74655 B | 11/1987 |
| JP | 54-19571 A | 2/1979 |

(Continued)

OTHER PUBLICATIONS

Japan Office Action for JP2012-552435 dated Mar. 3, 2015.
(Continued)

*Primary Examiner* — William R Harp
(74) *Attorney, Agent, or Firm* — Birch, Stewart, Kolasch & Birch, LLP

(57) ABSTRACT

A method and apparatus for handling and conveying a material, for example a waste material, in a pneumatic pipe transport system which includes the steps and apparatus for introducing the material to a rotary press device, the rotary press device containing rotating and stationary apertures which are eccentrically arranged with respect to an axis of rotation of the rotating apertures, compacting and compressing the material within the rotary press device and transferring the compacted and compressed material downstream to an output transport system, wherein the material is conducted and transported into the rotary press device and through the rotary pressure device to the output transport system, at least partially, by suction and/or pressure difference in the pneumatic pipe transport system.

19 Claims, 10 Drawing Sheets

(51) Int. Cl.
  *B65G 51/02* (2006.01)
  *B02C 18/00* (2006.01)

(56) References Cited

U.S. PATENT DOCUMENTS

| | | | | |
|---|---|---|---|---|
| 3,933,393 | A | * | 1/1976 | De Feudis .................... 406/130 |
| 4,227,451 | A | * | 10/1980 | Slavinsky et al. ............. 100/295 |
| 2007/0183855 | A1 | * | 8/2007 | Sundholm .................... 406/141 |

FOREIGN PATENT DOCUMENTS

| | | |
|---|---|---|
| RU | 1261854 A1 | 10/1986 |
| WO | 82/03200 A1 | 9/1982 |
| WO | 01/21315 A1 | 3/2001 |
| WO | 2009/130374 A1 | 10/2009 |

OTHER PUBLICATIONS

Decision on Grant issued by Russian Patent Office regarding RU 2012139021, dated Apr. 20, 2015.

* cited by examiner

METHOD AND APPARATUS FOR HANDLING MATERIAL IN A PNEUMATIC PIPE TRANSPORT SYSTEM

BACKGROUND OF THE INVENTION

The object of the present invention is to provide a method and apparatus for handling a material in a pneumatic pipe transport system.

The invention relates generally to materials handling systems, such as to partial-vacuum conveying systems, more particularly to the collection and moving of wastes, such as to the moving of household wastes.

Systems wherein wastes are moved in piping by means of a pressure difference or suction are known in the art. In these, wastes are moved long distances in the piping by sucking. It is typical to these systems that a partial-vacuum apparatus is used to bring about a pressure difference, in which apparatus a partial vacuum is achieved in the transfer pipe with partial-vacuum generators, such as with vacuum pumps or with an ejector apparatus. A transfer pipe typically comprises at least one valve means, by opening and closing which the replacement air coming into the transfer pipe is regulated. Refuse chutes are used in the systems at the material input end, into which refuse chutes material, such as waste material, is input and from which refuse chutes the material to be transferred is transferred into a transfer pipe by opening a discharge valve means, in which case, by means of the sucking effect achieved by means of the partial vacuum acting in the transfer pipe and also by means of the surrounding air pressure acting via the refuse chute, material such as e.g. waste material packed into bags, is transferred from the refuse chute into the transfer pipe. The pneumatic waste transfer systems in question can be utilized particularly well in densely populated urban areas. These types of areas have tall buildings, in which the input of wastes into a pneumatic waste transfer system is performed via a refuse chute arranged in the building.

The refuse chute is a vertical pipe, preferably comprising a number of input points, which are typically arranged in the wall of the refuse chute at a distance from each other. Tall buildings can comprise many tens, even hundreds, of storeys, in which case the refuse chute forms a very high pipe.

Wastes are pneumatically transferred in a closed system to a reception station, in which the wastes are compressed with a press only after transportation. The pipes of a pneumatic transfer system are in normal cases rather large in diameter, e.g. in the region of 500 mm in their diameter.

Also known in the art are solutions, wherein a waste mill, such as a waste grinder, with which the wastes to be input are ground into small size, is arranged in connection with or in the proximity of a waste input location. A waste mill grinds wastes but does not compress the wastes. In the solution in question the blades of waste mills are also subjected to large stressing, in which case they must be replaced often.

Publication WO8203200 A1 discloses a device for fine-grinding, compressing and outputting a high-volume bulk good, more particularly household wastes, by means of which device waste material conducted through the device can be compacted.

The aim of the present invention is to achieve a new type of solution in connection with refuse chutes, by means of which solution the drawbacks of prior art solutions are avoided.

BRIEF DESCRIPTION OF THE INVENTION

The solution according to the invention has a number of significant advantages. By means of the invention a very efficient solution for pneumatic pipe transport of material is achieved. Particularly waste material can, with the solution according to the invention, be efficiently compacted with the rotary press according to the invention and efficient transportation can be achieved with a significantly smaller pipe size compared to uncompressed waste material. By using suction to transfer the material to be handled from the rotary press into the transport pipe, an advantageous solution for a combination of a rotary press and pipe transport is achieved. The handling means of a rotary press are preferably formed from a number of plate parts fixed to each other and arranged one on top of another, in which case an advantageous solution that can be easily modified according to the application is achieved in order to form a handling means. The shape of the handling means is additionally such that when changing the direction of rotation they can also be used as a cutter. In this case clogging of the rotary press can be ascertained or prevented by the material to be handled. The handling devices of a rotary press are preferably driven with a drive device and with applicable power transmission means. According to one preferred embodiment a belt transmission is used to transmit force. There can be one or more drive devices. When using hydraulic motors the available torque can be increased by using two motors. The motors can be controlled on the basis of pressure, in which case at first both the rotatable handling means are driven with one shared motor and when the pressure of the system grows, owing to the material to be handled, the second motor is also connected into use. In this case, according to the embodiment, the torque increases, e.g. doubles, and the speed of rotation decreases, e.g. halves. According to a second preferred embodiment, the drive devices can be connected so that each rotatable handling means can, if necessary, be rotated with its own motor, in which case the direction of rotation can be varied individually, in which case the handling means can also be rotated, if necessary, in opposite directions with respect to each other. Additionally, if necessary, the whole output power can be connected to drive only just one rotatable handling means. On the other hand, the material to be handled can be further compressed with a second compression phase arranged between the output aperture of the rotary press and the transport pipe, in which compression phase the press device is a piston-cylinder combination. The transfer of the handled material into a transfer pipe is also achieved with the second press device. According to one preferred embodiment, the second press device is two-phased, in which case the first piston part, which is larger in its cross-section, compacts the material coming from the rotary press further and the second piston part, which is smaller in its cross-section, presses, typically with a greater surface pressure, the material via the output aperture into the piping. The compressive force of the first piston part is achieved according to some embodiments e.g. with a preloaded spring element or with a pressure medium, such as with gas or hydraulically. The first piston part and the second piston part are connected together such that preferably the operating power of the first piston part is charged by means of the return movement of the second piston part. According to one embodiment of the invention, impurities, such as waste material, built up in the output chamber at the end of the compression surface of the piston element are removed by blowing with pressure medium, such as with gas, liquid or a mixture of them. According to one preferred embodiment, when using gas as the drive medium of the compressive movement in the cylinder-piston combination, the exhaust gas of the return movement can be blown towards the output aperture in the output chamber and can thus be used to transfer the handled material forward into the transfer pipe/in the transfer pipe. After the compression the handled material, more particularly waste material, is transferred in the piping by means of suction or by means of suction and overpressure.

BRIEF DESCRIPTION OF THE FIGURES

In the following, the invention will be described in more detail by the aid of an example with reference to the attached drawings, wherein.

DETAILED DESCRIPTION OF THE INVENTION

Figure 1:
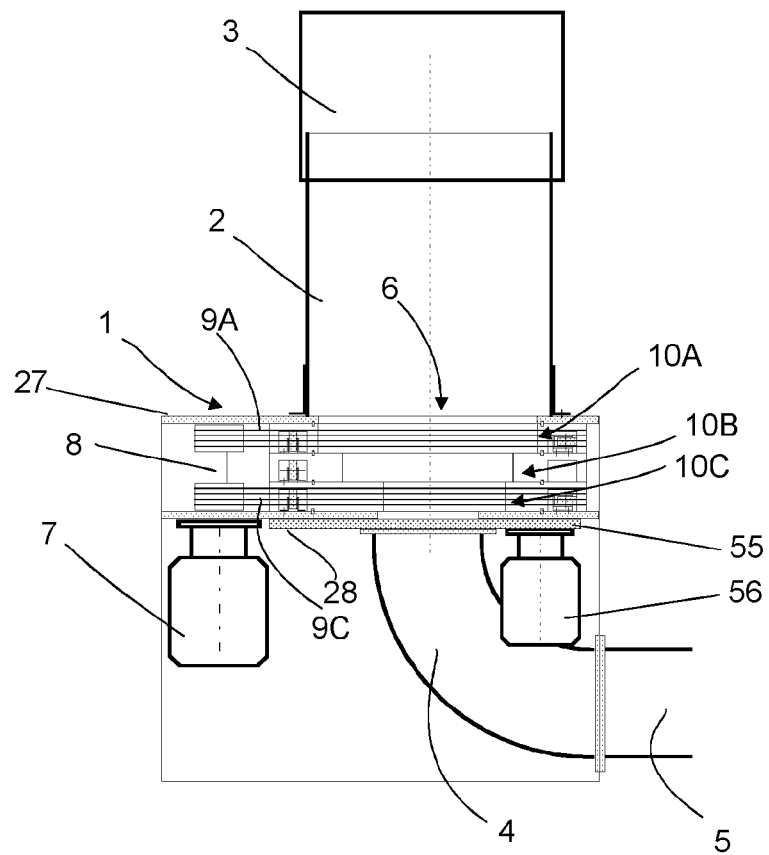
FIG. 1 presents a simplified embodiment of an apparatus according to the invention.

FIG. 1 presents one embodiment of the solution according to the invention, in which the rotary press device 1 is arranged in connection with a refuse chute 3 or corresponding with a fitting part 2. Only a part of the refuse chute is presented. The material, such as household waste, is input into a refuse chute 3 and from there onwards, via a fitting part 2, into the input aperture 6 of the rotary press 1.

The material to be handled is compressed and compacted in the rotary press and after handling it is conducted via an output coupling 4 into the transfer piping 5 by means of suction and/or a pressure difference produced by e.g. the drive devices of a pneumatic pipe transport system. One advantage of the embodiment of the invention is that the waste material is made into a compacted shape, in which case a transfer piping 5 that is significantly smaller in diameter can be used. According to one embodiment e.g. a pipe with a diameter in the region of 150-300 mm, preferably in the region of 200 mm, can be used as a transfer pipe 5. According to the invention simultaneous suction is used in the embodiment, in which case the material to be handled can be influenced with suction or a pressure difference acting via the transfer pipe and the output coupling 4 when conducting material through the handling means 10A, 10B, 10C of the rotary press 1. The handling means are rim-like, each of which has an aperture 11A, 11B, 11C (FIGS. 4a, 4b, 4c) from the first side, from the input side, to the output side. At least a part of the handling means are rotated in the embodiment of the figure around the vertical axis with the drive device 7 and with transmission means 8, 9A, 9C. In the figure the topmost rotatable handling means 10A and the bottommost rotatable handling means 10C are rotated and between them remains a non-rotating, stationary handling means 10B. A valve means 55, such as a disc valve, which is driven with a drive device 56 of the valve, is disposed below the rotary press 1. The valve means 55 opens and closes the connection between the rotary press and the output coupling 4 and thus the suction effect from the transfer pipe into the rotary press is regulated with the valve means 55.

Figure 2:
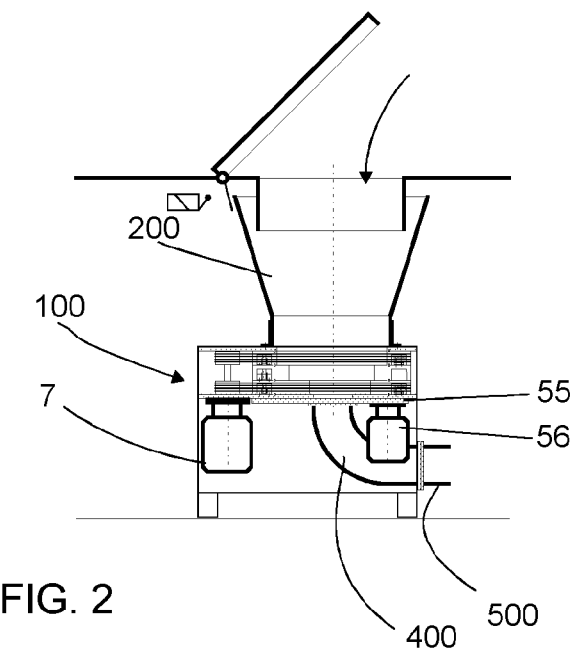
FIG. 2 presents a simplified embodiment of an apparatus according to the invention.

Correspondingly, according to the second embodiment of the invention, the rotary press is used in the embodiment of FIG. 2 in connection with an input point of the materials handling system, such as in connection with an input point of kitchen waste. The rotary press 100 is adapted in connection with the feeder hopper 200 of an input point, in which case the material to be handled is input from the feeder hopper 200 into the input aperture of the rotary press. In the rotary press the material is compacted and is conducted from the output coupling 400 to further handling e.g. via the transfer piping 500 of a pneumatic pipe transport system.

Figure 3:
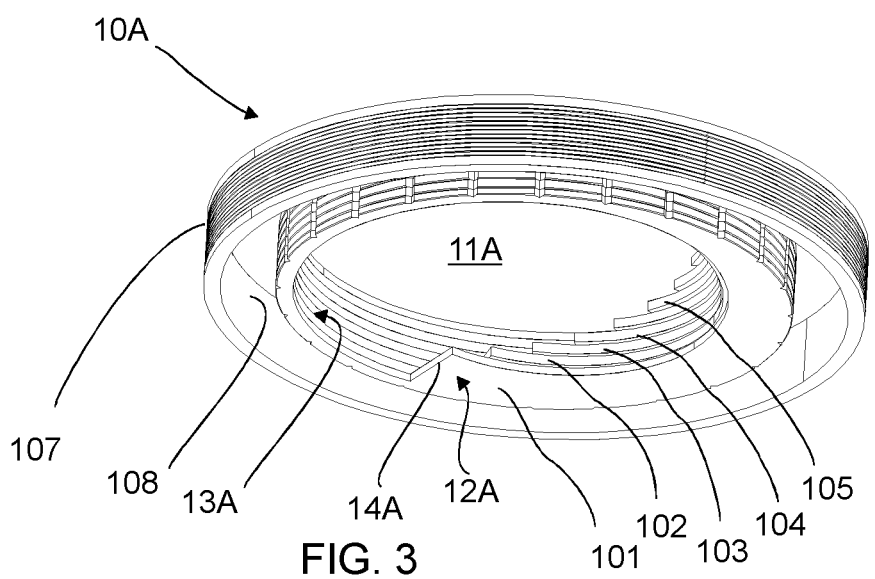
FIG. 3 presents a handling means of an apparatus according to the invention.

FIG. 3 presents a first rotatable ring-like handling means 10A according to an embodiment of the invention, which handling means can be adapted to the rotary press mainly below the input aperture 6. The ring-like handling means 10A comprises a mainly circular cylindrically-shaped flange 107. A ring-like handling means can be formed e.g. from a number of plate parts 101, 102, 103, 104, 105 arranged one on top of another and fixed to each other. The plate parts adapted one above the other to form a ring-like handling means can be adapted among themselves with respect to each other such that the sections formed by their inward-pushing part 12A are displaced with respect to each other, in which case they are e.g. at an angle of 5-30 degrees, preferably at an angle of 10-20 degrees, with respect to each other. In addition, a cutting blade 14A can be achieved when the direction of rotation changes.

The ring-like handling means or at least a part of them is/are typically formed from a number of plate parts 101, 102, 103, 104, 105 that are fixed to each other one on top of the other. The parts 101, 102, 103, 104, 105 can be formed so that an aligning aperture is arranged in them in the machining phase, in which aligning aperture the desired displacement of the plate parts with respect to each other is taken into account and from which aligning aperture the plates can be fixed to each other e.g. by welding.

Figure 7:
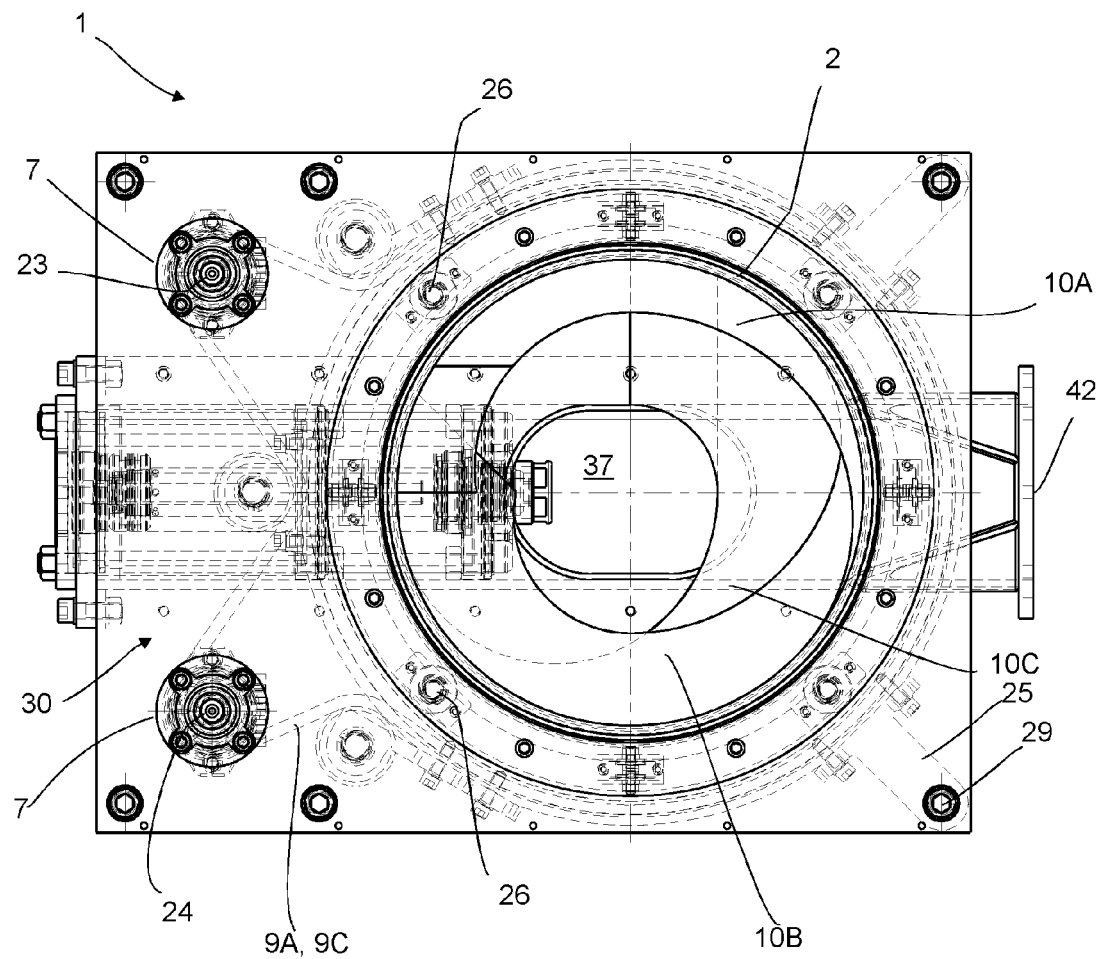
FIG. 7 presents an embodiment according to FIG. 6 as viewed from the input direction.

In the embodiment of FIG. 3 a counterpart 108, such as a groove, is arranged in the ring-like element for the aligning element, for a bearing 26 (FIG. 7) or for corresponding.

Figures 4A, 4B, 4C:
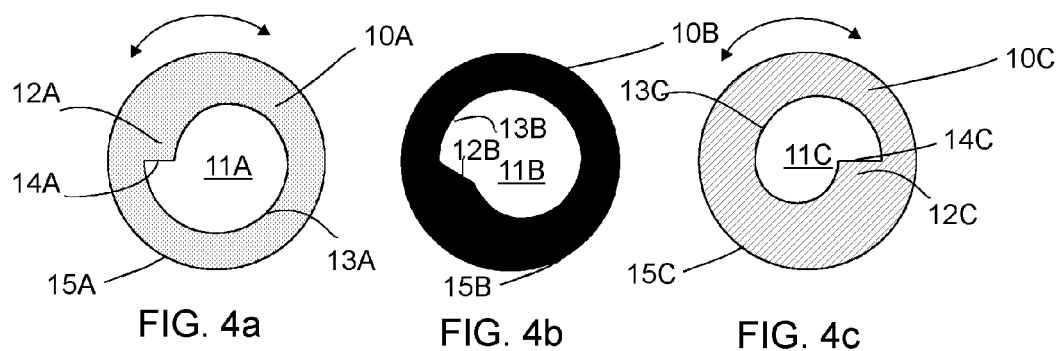
FIG. 4a presents a simplified first rotatable handling means of an apparatus according to the invention.
FIG. 4b presents a simplified first stationary (non-rotatable) handling means of an apparatus according to the invention.
FIG. 4c presents a simplified second rotatable handling means of an apparatus according to the invention.

As is particularly presented in the diagrammatic FIG. 4a, the first handling means 10A is provided with a wing-shaped part 12A pushing inwards towards the center of the ring, which part takes a part of the surface surrounded by the ring and which part is shaped with a wing surface 13A (surface pattern) facing towards the center axis of the handling means 10A, the curved shape of which wing surface can preferably be a so-called Archimedes spiral, i.e. it has an inwardly decreasing radius. The part 12A pushing towards the center of the handling means thus limits the eccentric aperture 11A going through the ring. When the handling means 10A is rotating, the wing surface 13A determines the through-passage aperture 11A through the handling means, which aperture is free of obstacles. A surface pattern, such as a threaded groove or a band, which when the handling means rotates in the input direction at the same time feeds material to be handled from the aperture 11A onwards in the handling direction, can be formed on the inner surface 13A, i.e., on the wing surface, of the handling means.

In the rotary press according to the invention a non-rotating handling means 10B that is fixed to the housing 27, 28, 29 with fixing elements 25 is adapted below the topmost rotating handling means 10A and supports it. The non-moving handling means 10B is typically formed in a corresponding manner to the rotating ring 10A described earlier. The dimensions of the wing-shaped part 12B thus decrease inwards as viewed in a direction radially to the center of the ring, which in one embodiment is opposite with respect to the direction of rotation of the rotating handling means.

The second handling means, i.e. the stationary handling means 10B, thus comprises, as is particularly presented in the diagrammatic FIG. 4b, a wing-shaped part 12B that comprises a wing surface 13B and that pushes inwards towards the center of the ring. The wing-shaped part 12B pushes farther in towards the center of the handling means than the corresponding part 12A of the handling means 10A.

Figures 4D, 4E:
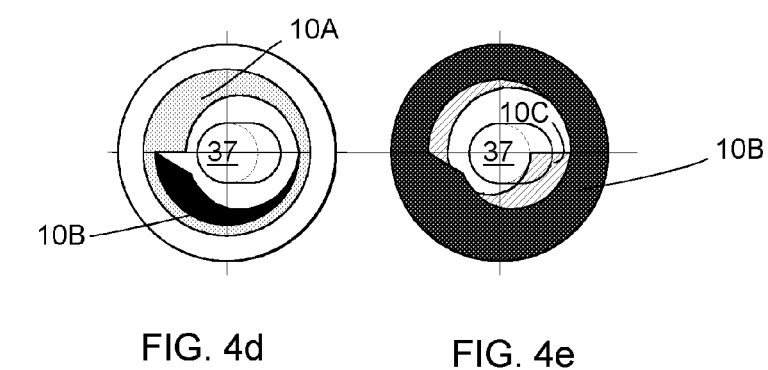
FIG. 4d presents a simplified view of an operating state of the first rotatable handling means and of the stationary handling means of an apparatus according to the invention, as viewed in the input direction.
FIG. 4e presents a simplified view of an operating state of the stationary handling means and of the second rotatable handling means of an apparatus according to the invention, as viewed in the input direction with the first rotatable handling means removed.

In a corresponding manner, the second rotatable handling means 10C also comprises, as is particularly presented in the diagrammatic FIG. 4c, a wing-shaped part 12C that comprises a wing surface 13C. The wing-shaped part 12C pushes to some extent to even farther in towards the center of the handling means 10C, so that when the handling means 10C is rotating the through-passage aperture free of obstacles is determined, which aperture is smaller than the corresponding free through-passage aperture in connection with the handling means 10A and 10B. FIG. 4d presents a free passage aperture after the first and the second handling means 10A, 10B and also an output aperture 37, which is smaller than the previous aperture, after the compression elements of the press. FIG. 4e presents an output aperture 37 after the second and the third handling means 10B, 10C, which output aperture is thus an essentially free through-passage aperture through the press.

The bottommost rotating handling means 10C is arranged rotatably on the base 28, which comprises an output aperture 37 for feeding out via it bulk good compressed by means of the rings.

The general operation of the rotary press is presented e.g. in publication WO8203200 A1, and it is not described in more detail in this publication.

Figure 5:
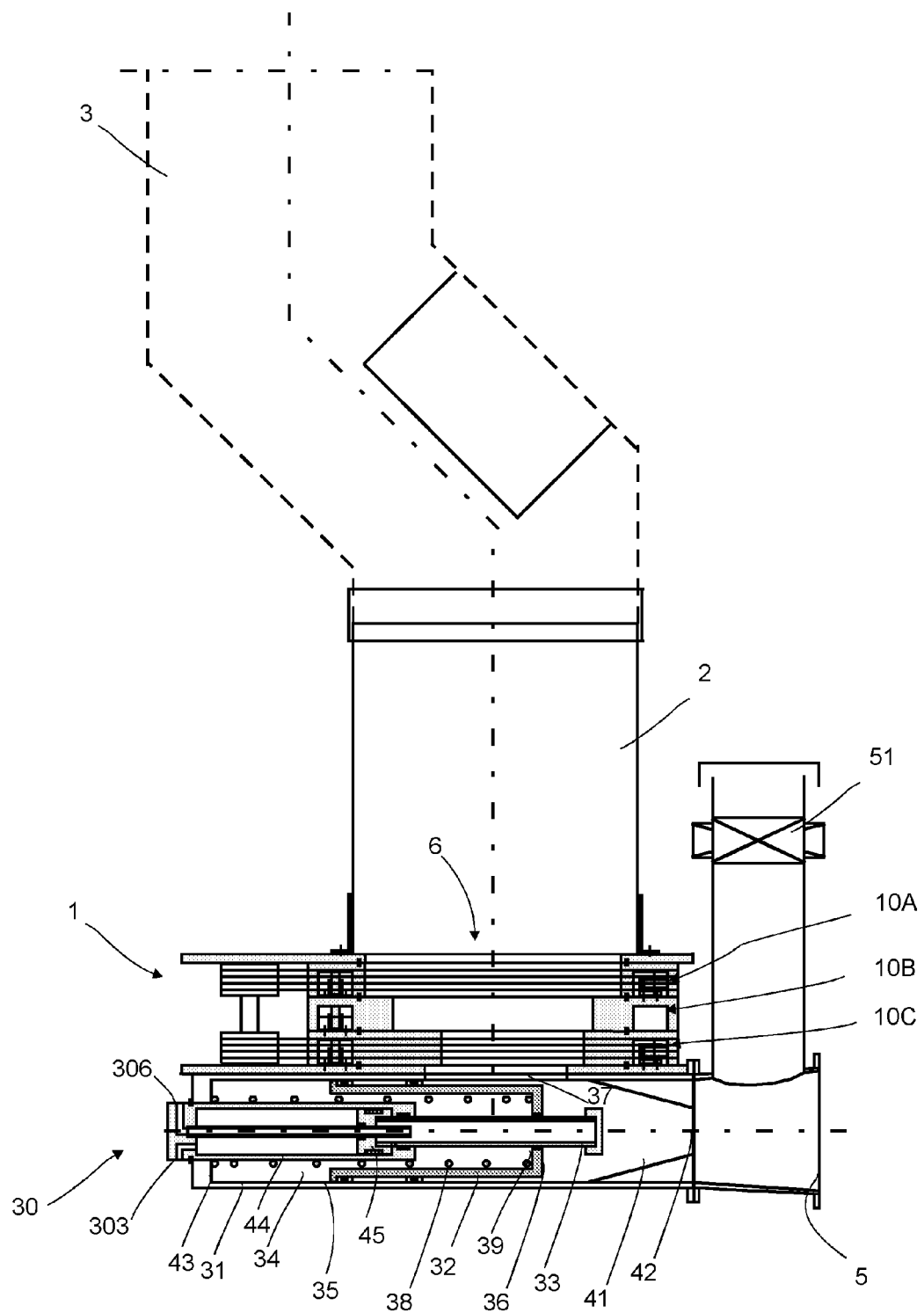
FIG. 5 presents a second embodiment of an apparatus according to the invention simplified and partially sectioned.
Figure 6:
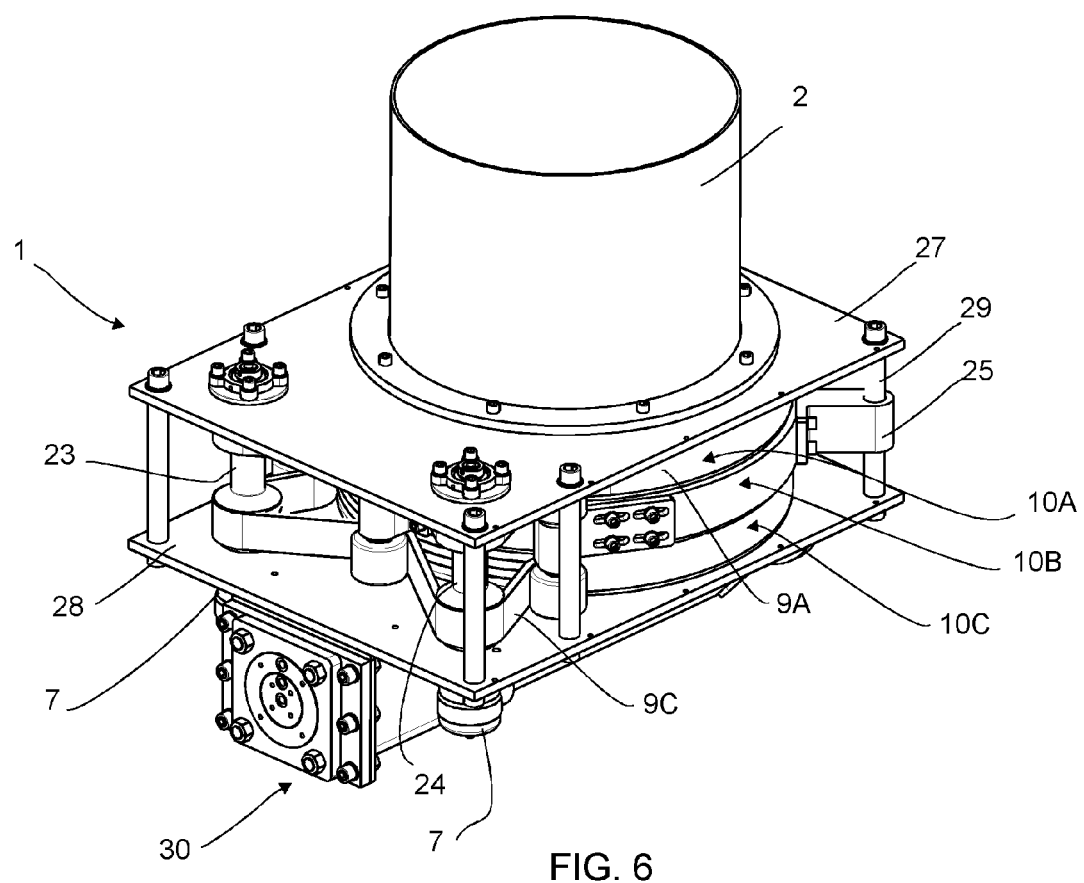
FIG. 6 presents a third embodiment of an apparatus according to the invention.

FIG. 5 presents one embodiment of a rotary press 1 with the drive device removed. The rotary press comprises a frame, onto which ring-like handling means 10A, 10B, 10C are arranged. In the vertical direction a plurality of ring-like handling means 10A, 10B, 10C, which are provided with parts 12A, 12B, 12C pushing into the aperture 11A, 11B, 11C that leads in a wing-like manner from the first side to the second side of the ring, are arranged below the input aperture 6 of the material to be handled. The ring-like handling means are adapted, in connection with a relative rotational movement, around a geometric axis, which is mainly identical with the geometric axis of an input chute, to transfer bulk good that is input by gravity through the ring-like handling means inwards into the center of the rings at least by compressing the bulk good simultaneously with the combined action between the wing-shaped parts of the rings rotating in opposite directions to each other. The handling means 10A, 10B, 10C can be adapted to rotate in opposite directions to each other but, as is presented in the preferred embodiment in FIG. 6, every second ring-like handling means 10B (in the figure, the centermost handling means 10B) is fixed immovably to the frame and every second ring-like handling means 10A, 10C (in the figure, the topmost and bottommost handling means) is fixed rotatably.

In the rotary press the material conducted through the handling means 10A, 10B, 10C is compressed and compacted.

If the rotating handling means 10A, 10C stops in the compression phase for a reason caused by the material, the direction of rotation of the handling means is changed, in which case the cutting blade 14A arranged in the handling means cuts the material to be handled and the possible blockage is removed, in which case the direction of rotation of the handling means is returned to the normal handling direction.

The ring-like handling means 10A, 10B, 10C or at least a part of them and their parts 12A, 12B, 12C pushing inwards are arranged to be such in their shape that their rotational movement simultaneously feeds material onwards from an aperture 11A, 11B, 11C towards the output end. Typically at least the rotating elements 10A, 10C are arranged to be such that they transfer material towards the output end and the output coupling 4.

The rotatable handling means are rotated with a drive device 7 by means of e.g. a transmission means, such as belt transmission 8, 9A, 9C, 21, 22. The outer rim 15A, 15C of the ring-like handling means 10A, 10C is adapted to function as a countersurface of the transmission means of the power transmission of the drive device, e.g. for a belt means, which is included in the power transmission apparatus for bringing about rotation of the ring. The rotation trajectory of the ring-like means is achieved by arranging limiting means and/or bearing means 26 and a countersurface to the ring-like handling means, most suitably a rim-like rolling surface or sliding surface, onto the rim of which the limiting means and/or bearing means 26 are arranged in a distributed manner. Typically the limiting means and/or bearing means are arranged between the bottommost ring-like handling means 10C and the base part 28 of the frame part, between the bottommost handling means 10C and the centermost, most suitably non-rotating, handling means 10B, and between the non-rotating handling means 10B and the topmost handling means 10A. It can also be conceived that separate rolling means are not used, but instead the ring-like parts are arranged to rest on one another and/or to rest on the frame part.

The rotational movement of the handling means can be achieved e.g. with an electric motor or with other arrangements. According to one preferred embodiment, the rotational movement is achieved with a hydraulic motor (such as in FIGS. 6 and 7) such that both the rotatable handling means 10A, 10C are rotated with two shared hydraulic motors 7. In this case in the normal operating process both the handling means 10A, 10C can be rotated with one motor. When a resistance caused by the material to be compressed occurs in the compression process, the pressure increases, which is detected with the pressure sensor P/I in FIG. 10, in which case the second hydraulic motor 7 is switched into use. In this case the speed of rotation of the handling means halves but the torque doubles. In FIG. 10 the rotation of the motors 7 is controlled with directional control valves 310, 311.

According to a second preferred embodiment, both rotatable handling means 10A, 10C are driven with their own drive devices, in which case the rotatable handling means 10A, 10B can also be rotated in different directions, such as in opposite directions with respect to each other. Thus also the whole power can be transmitted to only one motor to be used for rotating only one handling means.

The embodiment of FIG. 5 also presents a second press device, i.e. a cylinder-piston combination 30, which can be used on the output side of the rotary press to further compress the handled material to be more compact and/or to transfer the handled material into the output aperture 42 and onwards into the transfer pipe 5. The piston-cylinder combination is typically operated by a spring, is hydraulically operated, or is operated by gas, or is operated by a combination of these.

The second press device 30, a cylinder-piston combination, is formed according to a preferred embodiment to comprise two piston parts 32, 33, in which case the first piston part 32, which is larger in its cross-sectional area, at first compresses the material that has been transferred from the output aperture 37 of the rotary press to the output chamber 41 to be more compact, and after that the second piston part 33 transfers the waste from the output chamber 41 onwards via the output aperture 42 into the transfer piping 5.

The cylinder-piston unit 30 comprises a cylinder part 31, into which the first piston part 32 is arranged in a sealed manner onto the wall 35 of the cylinder space 34 of the cylinder part 31. The first piston part 32 is arranged movably in the cylinder space 34 to move between a first position, in which the first piston part 32 is in a retracted position, and a second position, in which the first piston part 32 is pushed outwards to the output chamber 41, extending to at least a part of the length of the output chamber 41 in the output direction. The second piston part 33 is arranged inside the first piston part 32 and is arranged to move at least between two positions, in the first position of which the second piston part 33 is in a retracted position, in which case it does not extend essentially from the butt-end surface 36 of the first piston part 32 towards the output aperture of the output chamber, and in the second position of which the second piston part 33 is in a protruded position, extending essentially from the butt-end surface 36 of the first piston part 32 towards the output aperture 42 of the output chamber 41.

The movement of the first piston part 32 from the first position towards the second position to be performed in the first phase can be performed with a preloaded spring means 38 or with a pressure medium, such as with gas or hydraulic medium.

FIG. 5 presents an embodiment in which a spring element 38 is used to move the first piston part from the first position to the second position. The spring element is arranged between the first piston part 32, the butt-end surface 39 of the inside of the first piston part in the figure, and the end 43 of the cylinder. The spring element is in a prestressed state in the first position of the piston part, in which case it has its first length. When the piston part is released, it moves from the effect of the spring force to the second position in the output chamber 41 towards the output aperture 42. In this case the compressed material coming from the rotary press via the aperture 37 to the output chamber 41 is compressed more in the direction of movement of the first piston part 32 and moves towards the output aperture 42. After that the second piston part 33, which has moved along with the first piston part, moves from the first position towards the second position, typically from the effect of the pressure medium, which is conducted into the second cylinder space of the cylinder 44, which space is inside the first cylinder space. The second piston part transfers the material of the output chamber towards the output aperture. After this the second piston part 33 returns to the first position and continues to move also the first piston part along with it to the first position of the first piston part, at the same time prestressing the spring part 38.

Figures 9, 9A:
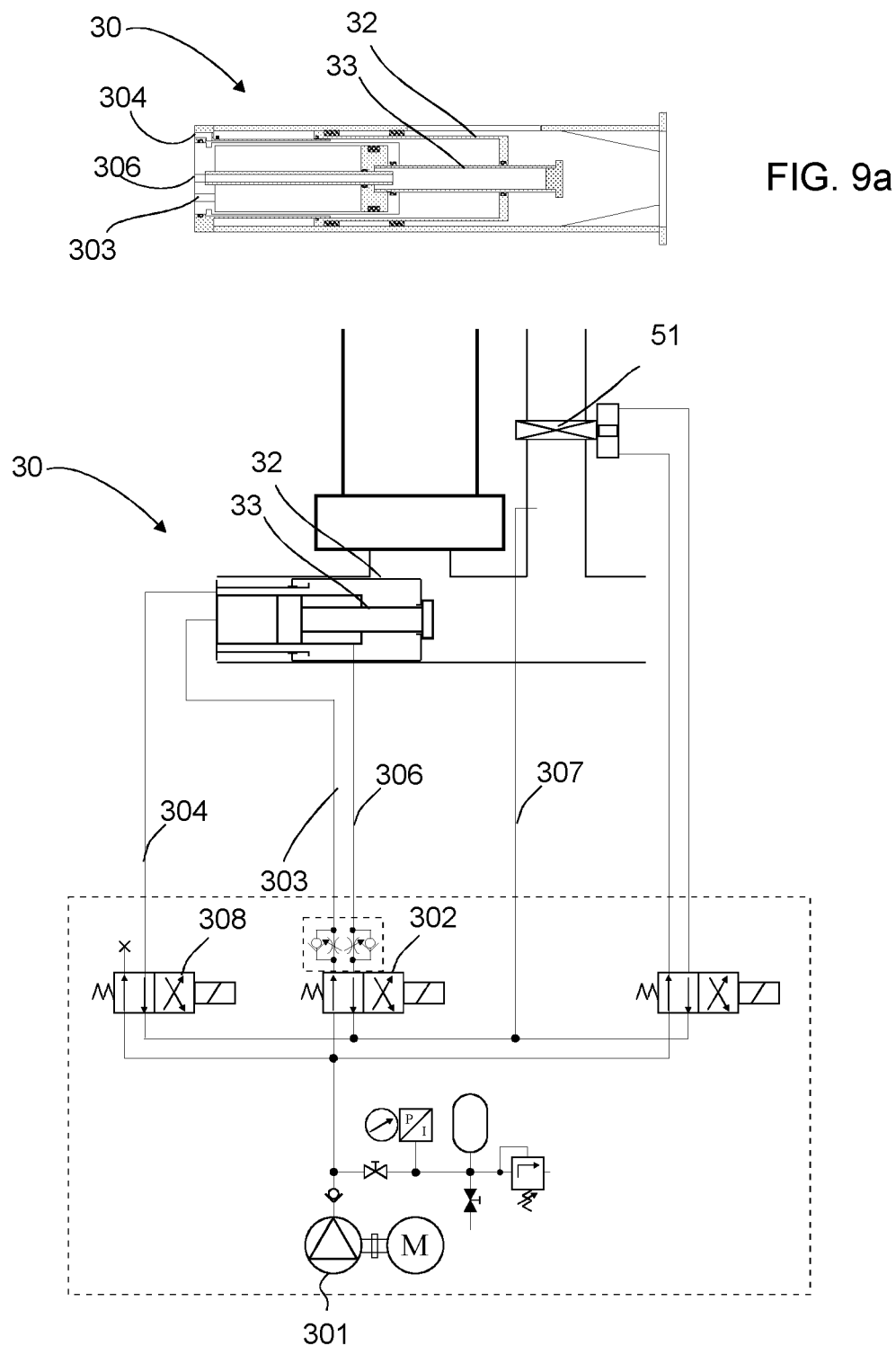
FIGS. 9, 9a present a part of an embodiment of an apparatus according to the invention and a pneumatic diagram of said part.
Figure 10A:
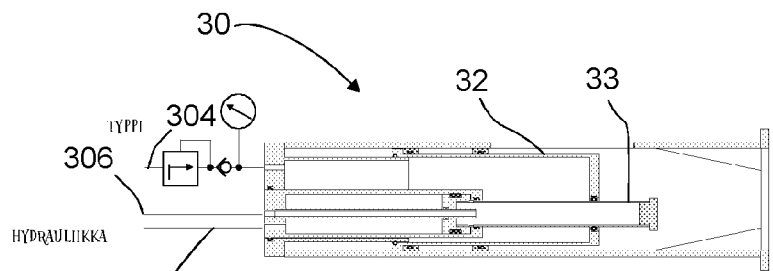
FIGS. 10, 10a, 10b present a part of an embodiment of an apparatus according to the invention and a hydraulic diagram of said part.
Figure 10B:
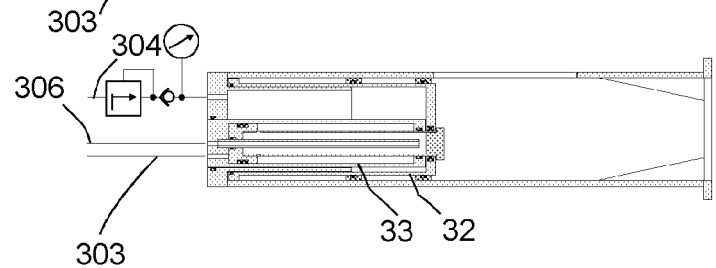
Figure 10:
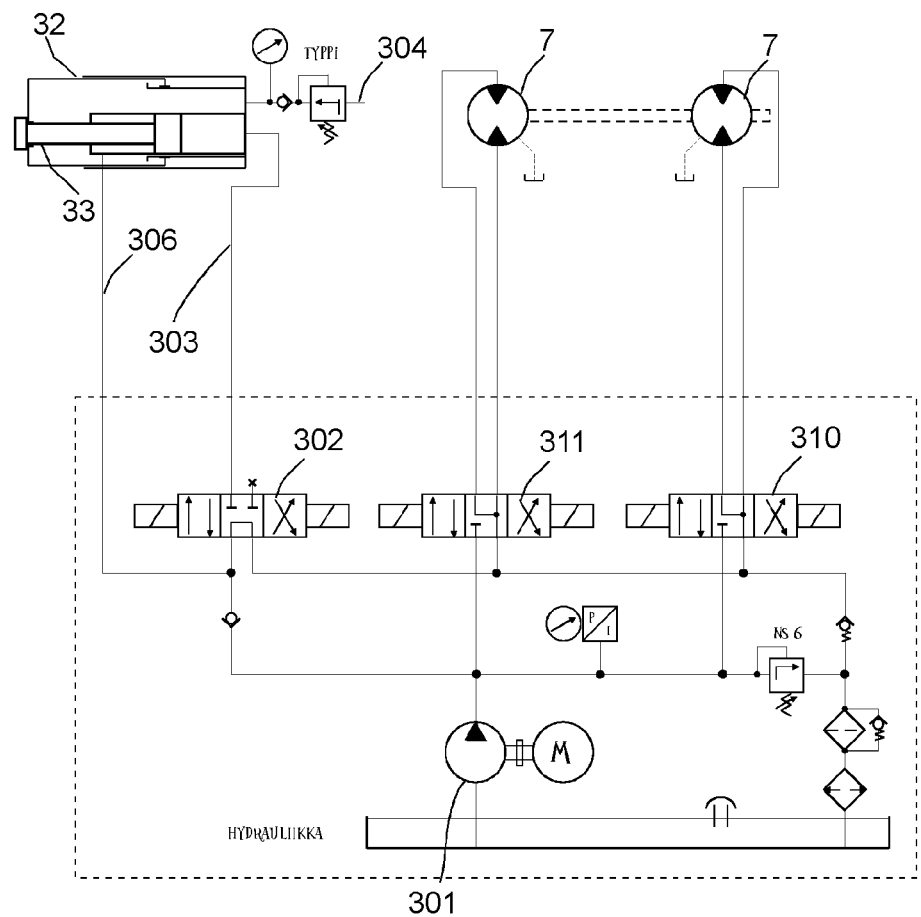

The second piston part 33 can be arranged symmetrically and concentrically with the first piston part 32 (FIGS. 8a, 9a) or eccentrically as in FIGS. 10a and 10b, in which case the second piston part is arranged downwards from the axis of movement of the first piston part.

Figure 8A:
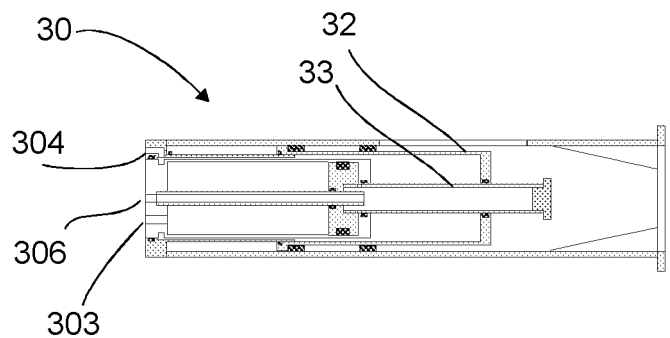
FIGS. 8, 8a present a part of an embodiment of an apparatus according to the invention and a pneumatic diagram of said part.
Figure 8:
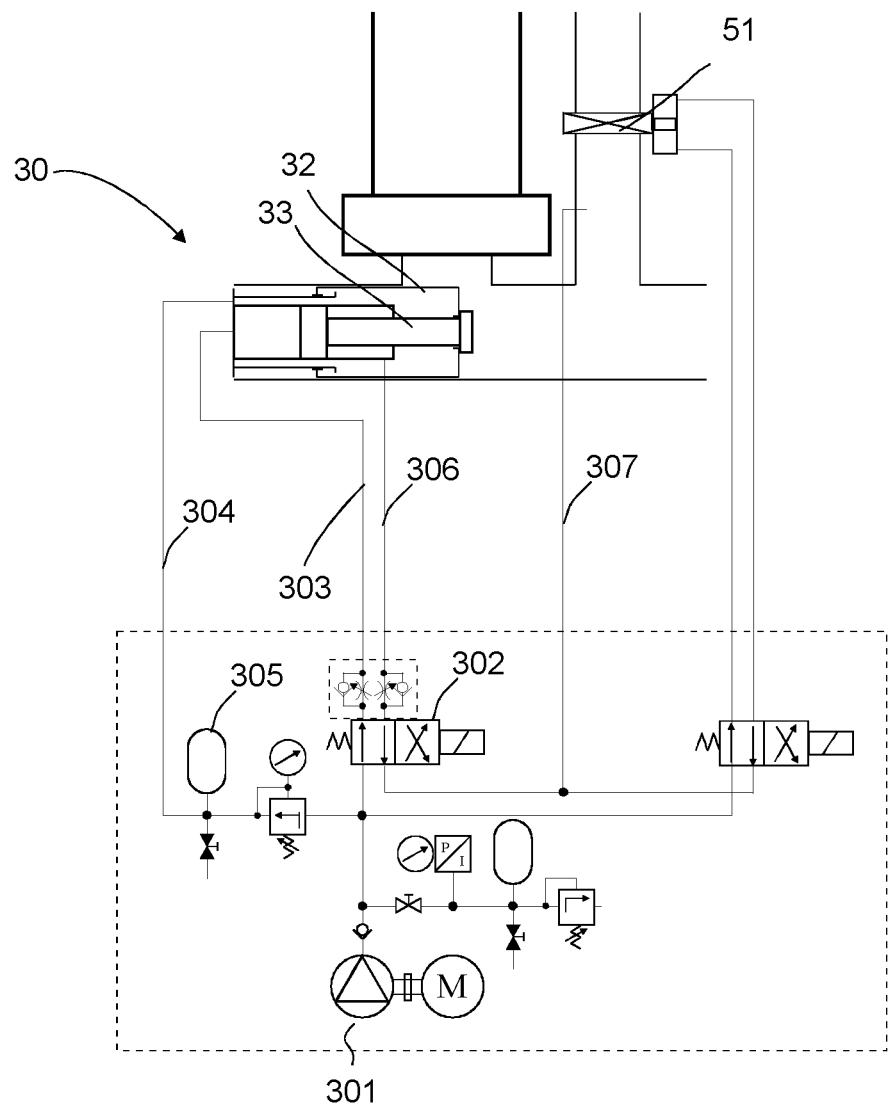

Gas, such as compressed air, can be the drive medium of the second press device 30. FIG. 8 and FIG. 8a present a diagrammatic embodiment in which a cylinder-piston combination is driven with gas. The figure presents a pump device 301, such as a compressor. The movement of the second piston part 33 can be controlled with a valve means 302 by conducting the pressure medium to the pathway 303 of the medium (on the cylinder side), in which case the piston part 33 moves outwards (to the right in the figure), or to the pathway 306 of the medium on the side of the piston rod 33, in which case the piston part moves back in (to the left in the figure). In the first phase, however, the first piston part 32 moves (to the right in the figure) from the action of the pressure medium when the pressure medium is conducted from the pressure chamber 305 along the pathway 304 of the medium into the cylinder space. After this the second piston part 33 moves onwards and pushes the material in the output chamber towards the output aperture. In the return phase the second piston part 33 also moves the first piston part 32 (to the left in FIG. 8), in which case gas is at least partly transferred into the chamber 305 and/or conducted to the output, such as into the transfer pipe or into its air junction along the pathway of the medium. The valve 51 of the air junction can also be controlled with the pressure medium.

FIGS. 9, 9a present a corresponding arrangement, in which the gas reservoir 305 of FIG. 8 is, however, not presented, but instead a control valve 308 driving the movement of the first piston is also arranged in the pathway 304 of the medium.

According to FIGS. 10 and 10a, 10b, a gaseous pressure medium, instead of a spring, can be used to move the first piston part 32, and a hydraulic medium to move the second piston part. The gas can be an incombustible gas, such as nitrogen, in which case undesired combustion can be prevented. The control of the hydraulic motors is also presented in the diagram. In this embodiment the hydraulic medium, such as hydraulic oil or water, is pumped with a pump device 301.

Figure 11A:
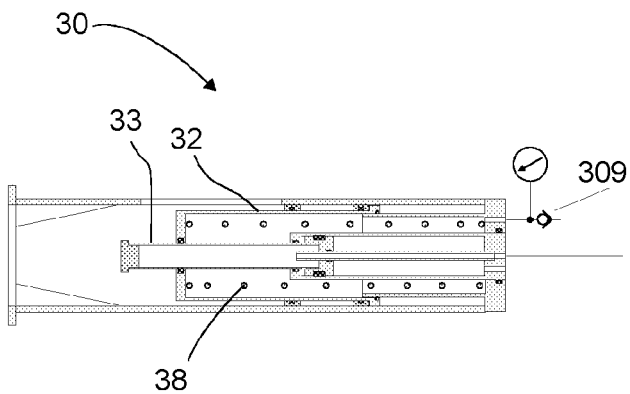
FIGS. 11, 11a, 11b present a part of an embodiment of an apparatus according to the invention and a hydraulic diagram of said part.
Figure 11B:
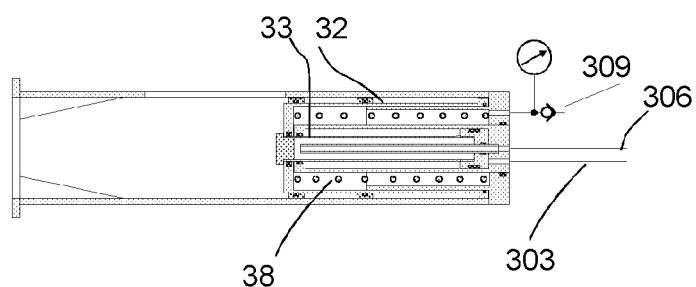
Figure 11:
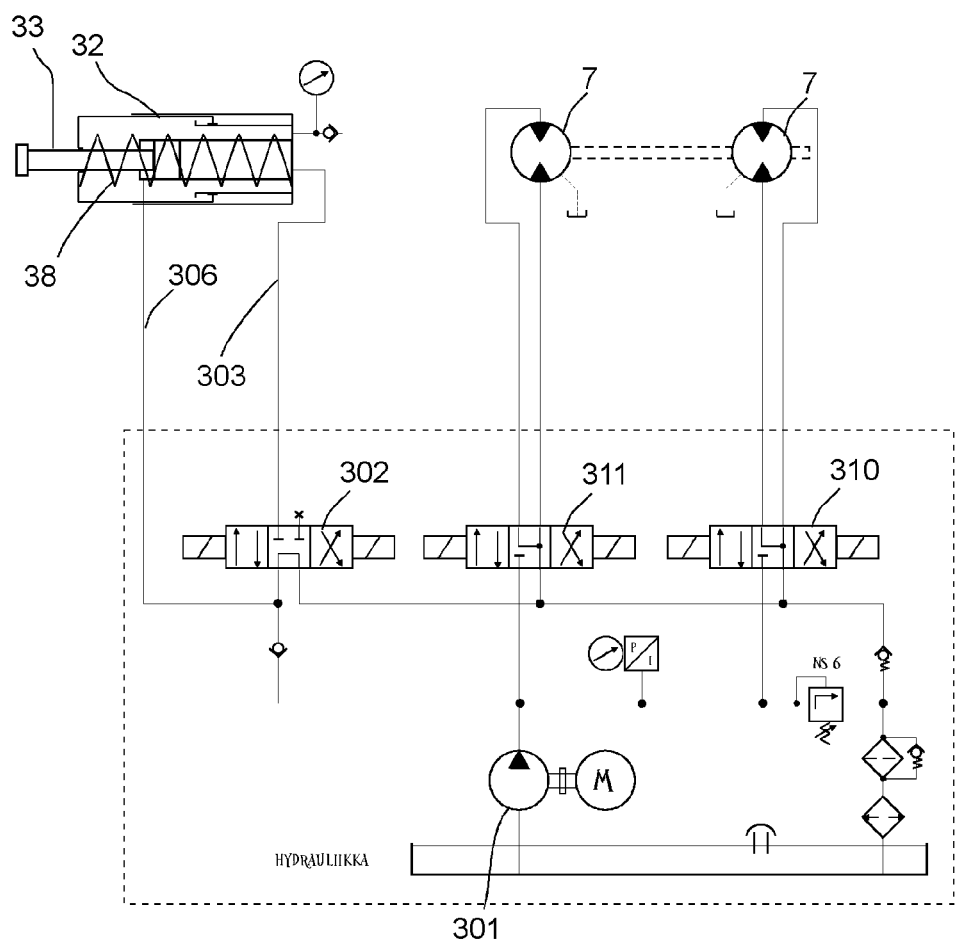

FIGS. 11, 11a, 11b present yet another arrangement according to the invention, in which a spring element 38 is used to move the first piston part 32 from the first position to the second position. The spring element is in a prestressed state in the first position (FIG. 11b) of the first piston part 32, in which case it has its first length. When the first piston part 32 is released, it moves from the effect of the spring force to the second position (FIG. 11a) in the output chamber towards the output aperture. After that the second piston part 33, which has moved along with the first piston part, moves from the first position towards the second position, typically from the effect of the pressure medium, which is conducted into the cylinder space of the second cylinder along the pathway 303 of the medium. The second piston part 33 transfers the material of the output chamber towards the output aperture. After this the second piston part 33 returns to the first position when the pressure medium is conducted along the pathway 306 of the medium. The embodiment according to FIGS. 11, 11a, 11b comprises a suction valve 309, which ensures that in the second position there is no partial vacuum in the cylinder of the first piston part. After this the second piston part 33 returns to the first position and continues to move also the first piston part 32 along with it to the first position of the first piston part, at the same time prestressing the spring part 38. The hydraulics compresses the air in the cylinder space of the first piston part when the first piston part moves to the first position along with the movement of the second piston part. The spring 38 ensures that the first piston part 32 moves from the first position out to the second position and receives an air replenishment via the suction valve 309. Compressed air can of course also be charged into the cylinder of the first piston part 32, in which case the compressive force produced by the first piston part is greater.

According to one embodiment of the invention the cylinder-piston unit 30 can be provided with a nozzle, in which case impurities possibly built up on the compression surface of the piston part in the output chamber 41 can be removed with a medium spray, which can be a gas spray or a liquid spray.

According to a second preferred embodiment gas is used as a compression medium, in which case the exhaust gas of the movement of the piston-cylinder unit is blown into the output chamber and/or into the output pipe, in which case material is transferred onwards in the pipe at least partly from the effect of the exhaust gas.

After the compression the handled material is transferred in the piping with suction or simultaneously with suction and overpressure.

According to one embodiment of the apparatus according to the invention, the starting of different phases is performed on the basis of the signal given by a pressure sensor.

The operating power for the simultaneous rotation of the rotating handling means 10A, 10C is produced via a power transmission apparatus, in the figures with a drive motor 7.

When the handling means 10A, 10C are made to rotate via the drive device and the power transmission means, the wing-shaped part 12A pushing towards the center of the ring in the first ring 10A acts on the material, such as on the household waste, that flows from the refuse chute 3 into the input chute 2. A bulk good is in this case, on the one hand, pushed inwards towards the center of the ring, and on the other hand, downwards in the axial direction from the effect of gravity and/or from the effect of suction and/or from the effect of the means transferring material, which means is achieved on the inner surface of the handling means. The bulk good in this case is forced into the grip of the wing surface of the non-moving ring 10B disposed below the ring 10A. The bulk good is compressed and in this case also transfers in this ring, on the one hand, inwards towards the center of the ring, and on the other hand, in the axial direction towards the next rotating ring 10C. Radial variations are thus produced in connection with the transfer through all the rings in the cylindrically-shaped chamber 41 adapted below the bottommost ring during the simultaneous axial input of the bulk good flow. From the effect of the reciprocal movement of the piston, the bulk good flow deviates in this cylindrically-shaped chamber in the direction of the transport pipe 5, in which case the movement of the piston brings about the compaction of the bulk good during its simultaneous output into the transfer pipe 5.

The degree of compression can be modified with an advantageous fitting of the length of the cylinder and of the stroke length of the piston. Household waste input into the pipe as a compressed flow is transferred onwards in the pipe by means of suction and/or a pressure difference to the reception location, such as to a waste station or corresponding.

The invention thus relates to a method for handling material in a pneumatic pipe transport system, in which material, such as waste material, is input from an input aperture of an input point, such as from the input aperture of a refuse chute 3 or of some other input point 200, and is handled with a press device 1, arranged in connection with the input point or in the proximity of it, to be more compact and is transferred onwards in the transfer piping. The press device is a rotary press, a part of the rim-like handling means 10A, 10B, 10C of which are rotatable and comprise an aperture 11A, 11B, 11C, which is arranged eccentrically with respect to the axis of rotation, and a part are stationary, in which case the material to be handled is conducted into the rotary press and/or through it at least partly by means of suction and/or a pressure difference of the pneumatic pipe transport system.

According to one preferred embodiment at least a part of the handling means 10A, 10C of the rotary press when rotating feed the material to be handled through the handling means.

According to one preferred embodiment in the direction of travel of the material the cross-sectional area of the material pathway passing through the handling means 10A, 10B, 10C of the rotary press decreases in the direction of travel.

According to one preferred embodiment a rotatable handling means 10A, 10C compresses material, together with at least one other handling means 10B, when it is rotated.

According to one preferred embodiment the handling means 10A, 10B, 10C is used to cut material when the direction of rotation is changed.

According to one preferred embodiment the rotatable handling means 10A, 10C are driven with a drive device 7 such that the torque can be varied.

According to one preferred embodiment the direction of rotation of each rotatable handling means 10A, 10C can be varied individually.

According to one preferred embodiment the drive device 7 is an electric motor, a pneumatic motor or a hydraulic motor.

According to one preferred embodiment after the rotary press 1 the material is further compressed with a second press device 30, which is a cylinder-piston combination.

According to one preferred embodiment after the rotary press 1 the material is influenced, particularly in the output coupling 4 or in the output chamber 41, with pressure medium, more particularly with gas, in which case the material is transferred from the output coupling or from the output chamber into the transfer piping 5 at least partly by blowing with pressure medium and further by the action of the pneumatic pipe transport system to the material delivery station, such as to a waste station. Typically gas, such as compressed air or other gas, can be used as pressure medium, which is conducted to the output coupling 4 and/or to the output chamber 41 along the pathway of the pressure medium, such as along the pathway 307 of the pressure medium. Typically material, such as waste handled with the rotary press 12, is blown for some distance in the transfer piping, e.g. until the main line (5-50 m) and in the main line it is sucked to a reception station, such as to a waste station.

The invention also relates to an apparatus for handling material in a pneumatic pipe transport system, which comprises at least one input point, such as a refuse chute 3 or some other input point 200, and a press device 1, arranged in connection with the input point or in the proximity of it, and means for transferring material onwards in the transfer piping. The press device is a rotary press 1, 100, a part of the rim-like handling means 10A, 10B, 10C of which are rotatable handling means 10A, 10C, and which comprise an aperture 11A, 11B, 11C, which is arranged eccentrically with respect to the axis of rotation of the rotatable handling means, and a part are stationary handling means 10B, and that the material to be handled is adapted to be conducted into the rotary press and through it at least partly by means of suction and/or a pressure difference of the pneumatic pipe transport system.

According to one preferred embodiment at least a part of the handling means 10A, 10B, 10C of the rotary press comprise surface patterning or a corresponding means, such as a thread section, feeding material, which surface patterning is adapted, when the handling means 10A, 10C is rotated, to transfer the material to be handled through the compression phase formed by the handling means of the rotary press.

According to one preferred embodiment in the direction of travel of the material the cross-sectional area of the material pathway 11A, 11B, 11C passing through the handling means 10A, 10B, 10C of the rotary press decreases in the direction of travel.

According to one preferred embodiment at least a part of the handling part of the handing means 10A, 10B, 10C is formed from plate parts 101, 102, 103, 104, 105 arranged one on top of another.

According to one preferred embodiment a means, such as a groove or a protrusion, feeding the material onwards is formed on the handling surface 13A, 13C of the handling means 10A, 10C.

According to one preferred embodiment a cutting blade section 14A, 14C, which is adapted to cut the material when the direction of rotation of the handling means 10A, 10C is changed, is arranged on a handling means.

According to one preferred embodiment after the handling means of the rotary press a second press device 30, which is a cylinder-piston combination, is adapted on the output side of said handling means.

According to one preferred embodiment the press device 30 is a cylinder-piston combination, which comprises two piston parts 32, 33, a first piston part 32 and a second piston part 33.

According to one preferred embodiment the first piston part 32 is larger in its cross-sectional area than the second piston part 33.

According to one preferred embodiment the second press device, its first piston part 32, is at first adapted to compress the material that is transferred from the output aperture of the rotary press 3 into the output chamber 41 to be more compact, and after that the second piston part 33 is adapted to transfer the material from the output chamber via the output aperture 42 onwards into the transfer piping 5.

According to one preferred embodiment the second press device is operated by a spring and/or by a pressure medium.

Typically the material is waste material, such as waste material arranged in bags. The refuse chute can be adapted to be a part of a pneumatic waste transfer system or it can be a separate part, in which waste material is conducted into a waste room, a waste container or corresponding.

It is obvious to the person skilled in the art that the invention is not limited to the embodiments presented above, but that it can be varied within the scope of the claims presented below. The characteristic features possibly presented in the description in conjunction with other characteristic features can, if necessary, also be used separately to each other.

The invention claimed is:

1. A method for handling and conveying a material in a pneumatic pipe transport system which comprises:
    introducing the material to a rotary press device, said rotary press device containing rotating and stationary apertures which are eccentrically arranged with respect to an axis of rotation of the rotating apertures, wherein, the direction of rotation of the rotating apertures is changed to cut the material being treated
    compacting and compressing the material within the rotary press device; and
    transferring the compacted and compressed material downstream to an output transport system,
    wherein the material is conducted and transported from the rotary press device to said output transport system, at least partially, by suction and/or pressure difference in the pneumatic pipe transport system.

2. The method according to claim 1, wherein the suction and/or pressure difference is at least partially created by a pressure medium introduced to the output transport system and by the action of the pneumatic pipe transport system.

3. The method of claim 2, wherein the pressure medium is a compressed gas.

4. The method of claim 1, wherein the material being conveyed is material waste.

5. The method according to claim 1, wherein the rotating aperture of the rotary press device feeds the material through the rotary press device.

6. The method according to claim 5, wherein, in the direction of travel of the material, the cross-sectional area of a material pathway passing through the rotary press device decreases in the direction of travel.

7. The method according to claim 1, wherein, a torque applied to the rotating apertures is varied.

8. The method according to claim 1, wherein, the direction of rotation of each of the rotating apertures can be individually varied.

9. The method according to claim 1, wherein after treatment in the rotary press the material is further compressed by a cylinder-piston combination.

10. An apparatus for handling and conveying material in a pneumatic pipe transport system which comprises:
    a rotary press device containing rotating and stationary material handing means which define rotating and stationary apertures which are eccentrically arranged with respect to an axis of rotation of the rotating material handing means, and
    a device for introducing the material to the rotary press device where the material is compacted and compressed and transferred downstream to an output transport system,
    wherein the material is conducted through the apparatus, at least partially, by means of suction and/or a pressure differences of the pneumatic pipe transport system, and
    wherein at least a part of the material handling means of the rotary press device comprises a surface pattern which facilitates the transfer of the material through the compression formed by the handling means of the rotary press.

11. The apparatus according to claim 10, wherein in the direction of travel of the material, the cross-sectional area of the material pathway passing through the rotating and stationary handling means of the rotary press device decreases in the direction of travel.

12. The apparatus according to claim 10, wherein at least a part of the material handing means is formed from plate parts arranged one on top of another.

13. The apparatus according to claim 10, wherein the surface pattern comprises a groove or a protrusion, formed on the surface of the material handling means.

14. The apparatus according to claim 10, wherein a cutting blade section forms part of the material handling means, which cutting blade section is adapted to cut the material when the direction of rotation of the material handling means is changed.

15. The apparatus according to claim 10, wherein an additional pressure creating device comprising a cylinder-piston combination, is provided on an output side of the rotary press device.

16. The apparatus according to claim 15, wherein the additional pressure device comprises a first piston part and a second piston part, the first piston part being adapted to compress the material that is transferred from the rotary press to the output transport system to be further compacted, and the second piston part being adapted to transfer the material from the output transport system to downstream transfer piping.

17. The apparatus according to claim 16, wherein the first piston part is larger in its cross-sectional area than the second piston part.

18. The apparatus according to claim 17, wherein the additional pressure device is operated by a spring and/or pressure medium.

19. The apparatus according to claim 10, wherein pressure/suction means are operatively associated with a downstream side of the rotary press device whereby the transfer of the material from the rotary press device to the output transport system is facilitated by the use of a pressure medium.

* * * * *